US 008137652B2

(12) United States Patent
Wong et al.

(10) Patent No.: US 8,137,652 B2
(45) Date of Patent: Mar. 20, 2012

(54) SIDEWALL-FUNCTIONALIZED CARBON NANOTUBES, AND METHODS FOR MAKING THE SAME

(75) Inventors: Stanislaus S. Wong, Middle Island, NY (US); Sarbajit Banerjee, Stony Brook, NY (US)

(73) Assignee: The Research Foundation of State University of New York, Albany, NY (US)

( * ) Notice: Subject to any disclaimer, the term of this patent is extended or adjusted under 35 U.S.C. 154(b) by 911 days.

(21) Appl. No.: 11/475,776

(22) Filed: Jun. 27, 2006

(65) Prior Publication Data

US 2010/0240922 A1    Sep. 23, 2010

Related U.S. Application Data

(62) Division of application No. 10/701,402, filed on Nov. 3, 2003, now Pat. No. 7,122,165.

(51) Int. Cl.
*C01B 31/00* (2006.01)
*D01F 9/12* (2006.01)
*C09C 1/56* (2006.01)

(52) U.S. Cl. ............... 423/415.1; 423/447.1; 423/447.2; 423/460; 977/745; 977/748; 977/847

(58) Field of Classification Search ............... 423/415.1, 423/447.1, 447.2, 460; 977/745, 748, 847
See application file for complete search history.

(56) References Cited

U.S. PATENT DOCUMENTS

| | | | |
|---|---|---|---|
| 6,872,681 B2 | 3/2005 | Niu et al. | |
| 7,459,137 B2 * | 12/2008 | Tour et al. | 423/447.1 |
| 7,632,481 B2 * | 12/2009 | Khabashesku et al. | 423/447.1 |
| 2005/0002850 A1 * | 1/2005 | Niu et al. | 423/447.1 |

OTHER PUBLICATIONS

V. Georgakilas; D. Voulgaris; E. Vazquez; M. Prato; D. M. Guldi; A. Kukovecz; H. Kuzmany. Purification of HiPCO Carbon Nanotubes via Organic Functionalization, JACS 2002, 124, 14318-14319.*
Z. Konya; I. Vesselenyi; K. Niesz, A. Kukovecz; A. Demortier; A. Fonseca; J. Delhalle; Z. Mekhalif; J. B. Nagy; A. A. Koos; Z. Osvath; A. Kocsonya; L. P. Biro; I, Kiricsi. Large scale production of short functionalized carbon nanotubes, Chem. Phys. Lett., 360 (2002), 429-435.*
J. March. Advanced Organic Chemistry, 3rd Ed., Wiley, 1985.*
D. B. Mawhinney; V. Naumenko; A. Kuznetsova; J. T. Yates, Jr.; J. Liu; R. E. Smalley. Surface defect site denisty on single walled carbon nanotubes by titration, Chem. Phys. Lett. 324 (2000), 213-216.*
T. Saito, K. Matsushige, K. Tanaka. Chemical treatment and modification of multi-walled carbon nanotubes, Physica B 323 (2002), 280-283.*
Sarbajit Banerjee, Michael G. C. Kahn, and Stanislaus S. Wong. Rational Chemical Strategies for Carbon Nanotube Functionalization, Chem. Eur. J. 2003, 9, 1898-1908.*
I. W. Chiang, B. E. Brinson, A. Y. Huang, P. A. Willis, M. J. Bronikowski, J. L. Margrave, R. E. Smalley, and R. H. Hauge. Purification and Characterization of Single-Wall Carbon Nanotubes (SWNTs) Obtained from the Gas-Phase Decomposition of CO (HiPco Process), J. Phys. Chem. B 2001, 105, 8297-8301.*
H. Hu, P. Bhowmik, B. Zhao, M. A. Hamon, M. E. Itkis, R. C. Haddon. Determination of the acid sites of purified single-walled carbon nanotubes by acid-base titration, Chem. Phys. Lett. 2001, 345, 25-28.*
Banerjee et al., "Rational Sidewall Functionalization and Purification of Single-Walled Carbon Nanotubes by Solution-Phase Ozonolysis" *J. Phys. Chem. B*, 106:12144-12151 (Nov. 1, 2002).
Chiang et al., "Purification and Characterization of Single-Wall Carbon Nanotubes" *J. Phys. Chem. B*, 105:1157-1161 (Jan. 12, 2001).
Hernadi et al., "Reactivity of different kinds of carbon during oxidative purification of catalytically prepared carbon nanotubes" *Solid State Ionics*, 141:203-209 (2001).
Rinzler et al., "Large-scale purification of single-wall carbon nanotubes: process, product, and characterization" *Appl. Phys. A: Mater. Sci. Process*, 67: 29-37 (1998).
Chiang et al., "Purification and Characterization of Single-Wall Carbon Nanotubes (SWNTs) Obtained from the Gas-Phase Decomposition of CO (HiPco Process)" *J. Phy. Chem. B*, 105:8297-8301 (Aug. 10, 2001).
Lu et al., "Can the Sidewalls of Single-Wall Carbon Nanotubes Be Ozonized?" *J. Phys. Chem. B*, 106:2136-2139 (Feb. 7, 2002).
Deng et al., "Oxidation of Fullerenes by Ozone" *Fullerene Sci. Technol.*, 5(5):1033-1044 (Mar. 17, 1997).
Heymann et al., "$C_{60}O_3$, a Fullerene Ozonide: Synthesis and Dissociation to $C_{60}O$ and $O_2$" *J. Am. Chem. Soc.*, 122:11473-11479 (Nov. 3, 2000).
Mawhinney et al., "Infrared Spectral Evidence for the Etching of Carbon Nanotubes: Ozone Oxidation at 298 K" *J. Am. Chem. Soc.*, 122:2383-2384 (Feb. 29, 2000).
Bahr et al., "Covalent chemistry of single-wall carbon nanotubes" *J. Mater. Chem.*, 12:1952-1958 (May 1, 2002).
Cai et al., "Ozonation of Single-Walled Carbon Nanotubes and their Assemblies on Rigid Self-Assembled Monolayers" *Chem Mater.*, 14:4235-4241 (Sep. 5, 2002).
Molhotra, et al., "Ozonolysis of [60]Fullerene," 1994, Journal of the Chemical Society, Chemical Communications, vol. 11, pp. 1339-1340.

* cited by examiner

*Primary Examiner* — Jerry Lorengo
*Assistant Examiner* — Carlos Barcena
(74) *Attorney, Agent, or Firm* — Hoffmann & Baron LLP (57) ABSTRACT

The invention provides a method of functionalizing the sidewalls of a plurality of carbon nanotubes with oxygen moieties, the method comprising: exposing a carbon nanotube dispersion to an ozone/oxygen mixture to form a plurality of ozonized carbon nanotubes; and contacting the plurality of ozonized carbon nanotubes with a cleaving agent to form a plurality of sidewall-functionalized carbon nanotubes.

20 Claims, 7 Drawing Sheets

SIDEWALL-FUNCTIONALIZED CARBON NANOTUBES, AND METHODS FOR MAKING THE SAME

This application is a divisional application of pending U.S. application Ser. No. 10/701,402 filed on Nov. 3, 2003 now U.S. Pat. No. 7,122,165. The entire disclosure of the aforementioned application is incorporated herein by reference.

BACKGROUND OF THE INVENTION

The present invention relates to the art of nanotechnology, and in particular, to carbon nanotube technology, its function and structure.

A carbon nanotube is a single graphene sheet in the form of a seamless cylinder. The ends of a nanotube typically have hemispherical caps. The typical diameter of a nanotube ranges from about 1 nm to 10 nm. The length of a nanotube potentially can be millions of times greater than its diameter.

Since their discovery in the early 1990s, carbon nanotubes have been the focus of intense study due to their very desirable and unique combination of physical properties. They are chemically inert, thermally stable, highly strong, lightweight, flexible and electrically conductive. In fact, carbon nanotubes may potentially be stiffer and stronger than any other known material.

Carbon nanotubes are currently being proposed for numerous applications, such as, for example, catalyst supports in heterogeneous catalysis, high strength engineering fibers, sensory devices and molecular wires for the next generation of electronics devices.

There has been particularly intense study of the electrical properties of nanotubes, and their potential applications in electronics. Metallic carbon nanotubes have conductivities and current densities that meet or exceed the best metals; and semiconducting carbon nanotubes have mobilities and transconductance that meet or exceed the best semiconductors.

Carbon nanotubes are grown by combining a source of carbon with a catalytic nanostructured material such as iron or cobalt at elevated temperatures. At such temperatures, the catalyst has a high solubility for carbon. The carbon links up to form graphene and wraps around the catalyst to form a cylinder. Subsequent growth occurs from the further addition of carbon.

A problem with the synthesis of carbon nanotubes is that the as-prepared material frequently contains a number of metallic and amorphous impurities, interfering with their reliable and optimal usage in applications such as field emission displays, molecular computers, and ultrahigh strength materials. Current techniques for purifying carbon nanotubes are based on bromination, plasma etching, chromatographic separation, cascade membrane microfiltration, sonication and oxidation of nanotubes.

The current processes for oxidizing nanotubes are acid reflux in solution or gaseous oxidation. Although these oxidative processes are capable of generating a variety of oxygenated functional groups, such as aldehydic, ketonic, esteric, alcoholic, and carboxylic moieties, these processes do not allow for rationally controlling the type of oxygen moieties placed on the nanotubes. Without control over the types of oxygen moieties, subsequent chemical derivatization and modulation of electronic and mechanical properties of the nanotubes is difficult.

Moreover, current oxidative processes only allow for oxygen moieties to be placed at the ends of the nanotubes, and at structural defect sites along the nanotube walls. With such restricted placement of oxygen moieties on nanotubes, the end-use applications of the carbon nanotubes are limited. Also, the high level of purity needed for various end-use applications of nanotubes is substantially undermined.

Furthermore, current oxidative processes are performed with nanotubes in the gaseous phase. High temperatures are required for such processes which may lead to damaging consequences, such as destroying the structural integrity of nanotubes and low product yield. Moreover, current oxidative processes tend to etch away from the defect sites and ends of nanotubes, thereby cutting nanotubes into short fragments. By etching nanotubes in such a manner, the aspect ratio of nanotubes cannot be maintained, let alone maximized.

Thus, the current methods for purifying carbon nanotubes involve unreliable, low-yield processes. Also, current methods for adding oxygen moieties to carbon nanotubes are unpredictable with respect to the location of the moieties, and the types of moieties. These shortcomings of current methods present obstacles for actualizing the utility of carbon nanotubes for end-use applications.

Accordingly, there remains a need for a reliable method of providing carbon nanotubes which have a high level of purity. Also, there remains a need for rationally controlling the location and types of oxygen moieties placed on carbon nanotubes.

SUMMARY OF THE INVENTION

The present invention provides ozonized carbon nanotubes with a high degree of primary ozonides attached to their sidewalls; carbon nanotubes which comprise a high degree of functional moieties attached to their sidewalls; and highly purified carbon nanotubes.

Accordingly, the present invention includes ozonized carbon nanotubes wherein about 3% to 30% of the sidewall carbon atoms have a primary ozonide attached.

The present invention also includes a method of ozonizing the sidewalls of carbon nanotubes. The method comprises exposing a carbon nanotube dispersion to an ozone/oxygen mixture to form a plurality of ozonized carbon nanotubes. The exposure of the carbon nanotube dispersion to the ozone/oxygen mixture takes place at a temperature of from about $-95°$ C. to about $-55°$ C. The ozone is added to the sidewalls by 1,3-dipolar cycloaddition to attach primary ozonides on the sidewalls of the nanotubes.

The present invention also includes carbon nanotubes in which about 1 to 16% of the carbon atoms on the sidewall of the nanotubes have an attached oxygen moiety. In one embodiment, the attached oxygen moieties comprise a high degree of carboxylic and/or esteric moieties, such as at least about forty percent, at least about fifty percent, or at least about sixty percent. In another embodiment, the attached oxygen moieties comprise a high degree of ketonic and/or aldehydic moieties, such as at least about thirty percent, at least about forty percent, or at least about fifty percent. In another embodiment, the attached oxygen moieties comprise a high degree of alcoholic and/or ether moieties, such as at least about twenty percent, at least about thirty percent, or at least about forty percent.

The present invention also includes a method of functionalizing the sidewalls of carbon nanotubes with oxygen moieties. The method comprises exposing a carbon nanotube dispersion to an ozone/oxygen mixture to form a plurality of ozonized carbon nanotubes; and contacting the plurality of ozonized carbon nanotubes with a cleaving agent. The exposure of the carbon nanotube dispersion to the ozone/oxygen mixture takes place at a temperature of from about $-95°$ C. to about −55° C. The ozone/oxygen mixture is preferably in the solution phase. The ozone/oxygen mixture preferably comprises 2% to 20% ozone by weight. The contact of the plurality of ozonized carbon nanotubes with cleaving agents takes place at a temperature of from about −95° C. to about −65° C. Preferably, the sidewall functionalized carbon nanotubes are quenched with organic solvents or acids.

Examples of cleaving agents used in the present invention include organic peroxides, such as hydrogen peroxide, sodium peroxide, and benzoyl peroxide; reducing agents such as dimethyl sulfide, piperidine, triethylamine and 3'-thiodipropionic acid and it salts; salts of borohydride and lithium aluminum hydride.

The present invention also includes methods of controlling the type of oxygen moieties placed on carbon nanotubes, in particular on the sidewalls of carbon nanotubes. The method comprises contacting a plurality of ozonized carbon nanotubes, which plurality comprises nanotubes with primary ozonides on their sidewalls, with a particular type of cleaving agent. For providing carbon nanotubes comprising predominately carboxylic and/or esteric moieties, peroxides are used as the cleaving agent. For providing carbon nanotubes comprising predominately ketonic and/or aldehydic moieties, reducing agents are used as the cleaving agent. For providing carbon nanotubes comprising predominately alcoholic and/or ether moieties, sodium borohydride solution or lithium aluminum hydride are used as the cleaving agent.

The present invention also includes methods of converting the oxygen moieties to other functional moieties, such as amides, thiols, acid halides, anhydrides, lactams, imides, lactones, nitriles, and mixtures thereof.

The present invention also includes carbon nanotubes comprising oxygen moieties on their sidewalls wherein the nanotubes comprises less than about 2 wt. % of iron, less than about 1.5 wt. % of iron, less than about 1.25 wt. % of iron, less than about 0.5 wt. % of iron, or less than about 0.1 wt. % of iron.

The present invention also includes a method of purifying a plurality of carbon nanotubes. The method comprises exposing a carbon nanotube dispersion to an ozone/oxygen mixture to form a plurality of ozonized carbon nanotubes, contacting the plurality of ozonized carbon nanotubes with a cleaving agent, and contacting the plurality of functionalized carbon nanotubes with acid.

The present invention also includes carbon nanotubes in which about 1 to 16% of the carbon atoms on the sidewall of the nanotube have attached functional moieties. Examples of functional moieties include amides, thiols, acid halides, anhydrides, lactams, imides, lactones, nitriles and mixtures thereof.

The present invention also includes a method of providing single carbon nanotubes and carbon nanotube bundles with a selected diameter. The method comprises exposing a carbon nanotube dispersion to an ozone/oxygen mixture to form a plurality of ozonized carbon nanotubes, as described above; and then retrieving single carbon nanotubes and carbon nanotube bundles with a selected diameter from the dispersion by selective solubilization.

The sidewall-functionalized carbon nanotubes, and methods of making the same, of the present invention provide several advantages over current technology.

For example, unlike current methods of oxidizing carbon nanotubes which do not allow for control over the location or type of oxygen moieties placed on nanotubes, the present invention provides methods of rationally controlling both the location and type of oxygen moieties. Such ability of controlled chemistry not only has relevance for photophysical analyses of carbon nanotubes but also for rational modulation of their electronic and mechanical properties.

Also, unlike current methods of oxidizing carbon nanotubes which place oxygen moieties virtually exclusively at the ends of nanotubes, and on defect sites, the present invention provides carbon nanotubes which are sidewall-functionalized. Such sidewall-functionalization expands and improves the end-use applications of carbon nanotubes, such as, for example, lithium intercalation; the adsorption and storage of gases; and composite formation.

Moreover, unlike current methods of purifying carbon nanotubes which are required to be performed at high temperatures thereby undermining the product yield, the present invention provides methods of purifying nanotubes which allow for a high product yield. Also, the sidewall-functionalization of carbon nanotubes provides nanotubes which have a higher level of purity than achieved by current oxidation techniques.

For a better understanding of the present invention, reference is made to the following description, taken in conjunction with the accompanying drawings, and the scope of the invention set forth in the claims.

BRIEF DESCRIPTION OF THE DRAWINGS

FIG. 1: Scanning electron micrographs of a number of SWNT samples: (a) sample 1 (with $H_2O_2$); (b) sample 2 (with DMS); (c) sample 3 (with $NaBH_4$); (d) Ctrl ozonized sample; (e) raw, as-prepared HiPco. Scale bars for these micrographs are 1 μm in each case.

FIG. 2: Transmission electron micrographs of (a) as-prepared HiPco SWNTs and (b) SWNTs after ozonolysis and HCl treatment. Scale bars are 130 and 140 nm, respectively.

FIG. 7: Pairs of high-resolution $C_{1s}$ XPS spectra for (a) sample 1 (with $H_2O_2$), (b) sample 2 (with DMS), (c) sample 3 (with $NaBH_4$), and (d) Ctrl sample. The bottom half of each figure pair in each section shows the curve fittings to the $C_{1s}$ peak. The spectra are fitted to nanotube carbons at 284.6 eV and to C—O, C=O, and O—C=O functional moieties at 286.3, 287.6, and 288.8 eV, respectively.

DETAILED DESCRIPTION OF THE INVENTION

The present invention relates to ozonized carbon nanotubes with a high degree of primary ozonides attached to their sidewalls; carbon nanotubes which comprise a high degree of functional moieties attached to their sidewalls; and highly purified carbon nanotubes.

A carbon nanotube of the present invention is a graphene sheet in cylindrical form. The sidewall of a carbon nanotube is the outer surface of the graphene sheet. The ends of a nanotube can be open, or can have hemispherical caps on one or both ends. A carbon nanotube of the present invention can be a semi-conducting nanotube or a metallic nanotube. (A metallic nanotube has no band gap.)

A carbon nanotube of the present invention is either a single-walled nanotube (SWNT) or a multi-walled nanotube (MWNT). A SWNT comprises only one nanotube. A MWNT comprises more than one nanotube each having a different diameter. Thus, the smallest diameter nanotube is encapsulated by a larger diameter nanotube, which in turn, is encapsulated by another larger diameter nanotube.

SWNTs typically have a diameter of about 0.7 to about 2.5 nm, and a length of up to about one mm. MWNTs typically have a diameter of about 3 to about 30 nm, and a length of up to about one mm.

SWNTs and MWNTs are produced, typically, as bundles. A bundle comprises a plurality of SWNTs or MWNTs. The diameter of a bundle of SWNTs is typically about 10 to 20 nm. The diameter of a bundle of MWNTs is typically about 2.5 to 250 nm.

Throughout this specification, there are ranges defined by upper and lower boundaries. Each lower boundary can be combined with each upper boundary to define a range. The lower and upper boundaries should each be taken as a separate element.

Figure 6:
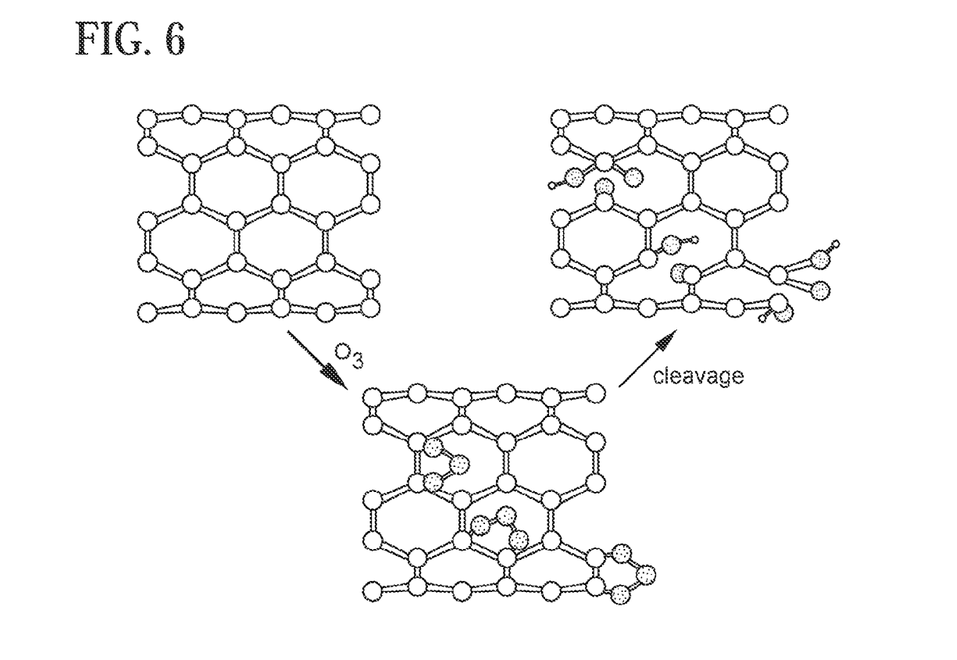
FIG. 6: Schematic of a section of a SWNT sidewall. Upon treatment with ozone, a proposed intermediate, a primary ozonide, forms. Cleavage of the ozonide with selected chemical agents can yield a range of different functional groups. As examples, the presence of aldehydic, ketonic, alcohol, and carboxylic groups are schematically illustrated.
Figure 7A:
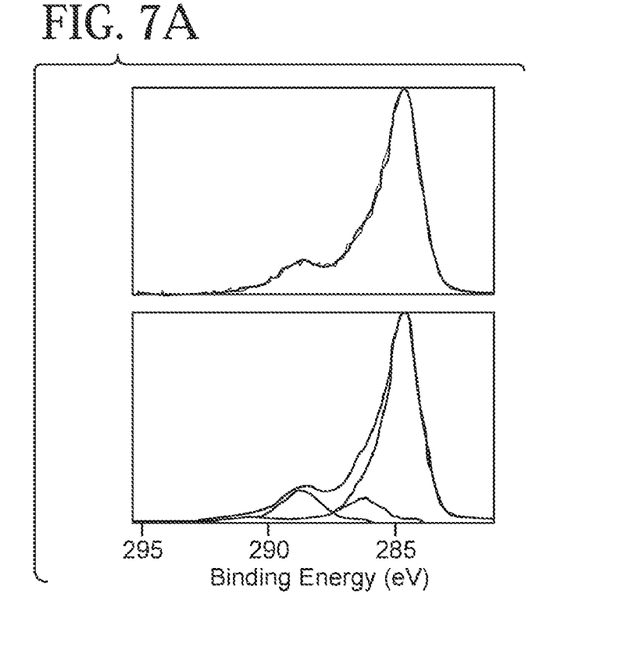
Figure 7B:
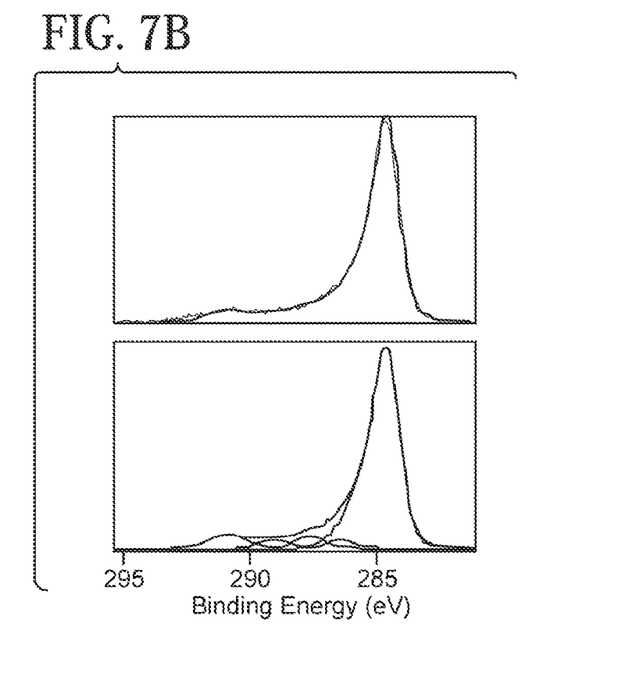
Figure 7C:
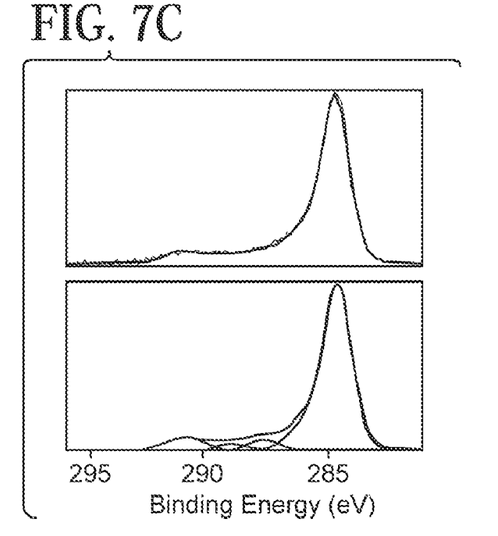
Figure 7D:
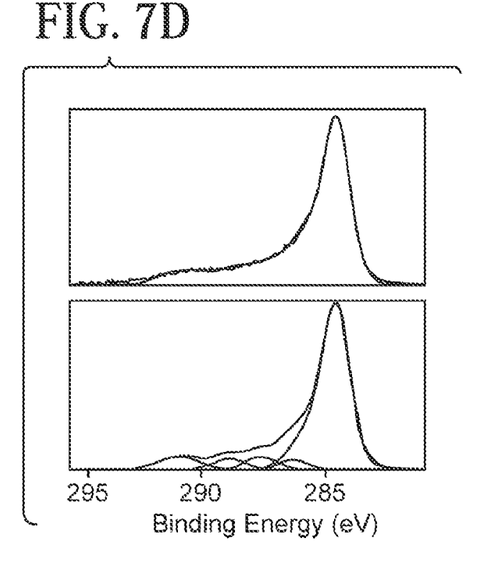

In one embodiment of the present invention, an ozonized carbon nanotube is provided. The ozonized carbon nanotube has primary ozonides attached to its sidewall. A primary ozonide is a 1,2,3-trioxolane. The primary ozonides are attached to the sidewall carbon atoms via 1,3-dipolar cycloaddition, thereby forming a five member ring which comprises two adjacent sidewall carbon atoms and three oxygen atoms, as shown in FIG. 6.

The quantity of primary ozonides that are attached to the sidewall of a carbon nanotube can be expressed by defining the percentage of carbon atoms which have a primary ozonide attached. The percentage can be expressed as a percentage range. Preferably, the range of the quantity of sidewall carbon atoms that have a primary ozonide attached has a lower boundary of approximately 3%. Examples of other lower boundaries include approximately 5%, 8%, 10% and 12%. Preferably, the range of the quantity of sidewall carbon atoms that have a primary ozonide attached has an upper boundary of approximately 30%. Examples of other upper boundaries include approximately 16%, 20% and 25%. An example of a range is about 5 to 20%.

In another aspect, the present invention provides methods of ozonizing the sidewalls of carbon nanotubes. The method comprises exposing a carbon nanotube dispersion to an ozone/oxygen mixture to form a plurality of ozonized carbon nanotubes. The exposure results in an ozonolysis reaction. Ozone becomes added to the carbon double bonds on the sidewalls of the nanotubes by 1,3-dipolar cycloaddition resulting in attached primary ozonides on the sidewalls of the nanotubes. The ozonolysis reaction preferably takes place on an ozonolysis apparatus as known in the art, such as, for example, a Welsbach ozonolysis apparatus, or a UV/$O_3$ generator in ambient air (Boekel Industries, Inc., Model 135500).

Preferably, exposure of the carbon nanotube dispersion to the ozone/oxygen mixture can take place in the solution phase, i.e. with the nanotube dispersion in a solvent. The solvent of the nanotube dispersion can be any solvent. Examples of solvents include methanol, acetic acid, water, or mixtures thereof. The reaction mixture, i.e. the nanotube dispersion in contact with the ozone/oxygen mixture, is preferably stirred during the ozonolysis reaction.

The exposure of the carbon nanotube dispersion to the ozone/oxygen mixture takes place at a temperature of from about −95° C. to about −55° C., more preferably from about −95° C. to about −70° C., and most preferably from about −95° C. to about −80° C.

The amount of ozone in the ozone/oxygen mixture can be expressed by defining the percentage by weight of ozone in the mixture. The percentage can be expressed as a percentage range. Preferably, the range of the amount of ozone in the mixture has a lower boundary of approximately 2% ozone by weight. Examples of other lower boundaries include approximately 5% and 8% ozone by weight. Preferably, the range of the amount of ozone in the mixture has an upper boundary of approximately 20% ozone by weight. Examples of other upper boundaries include approximately 10% and 15% ozone by weight.

The proportion of ozone in the mixture depends upon the particular instrument used for ozonolysis and the extent of functionalization desired. As the proportion of ozone in the mixture is increased, the amount of primary ozonides attached to the nanotubes also increase.

The ozonolysis reaction takes place for about thirty minutes to about four hours, preferably for about one to two hour(s). The amount of time required for ozonolysis is directly related to the concentration of ozone in the ozone/oxygen mixture, as would be known by a skilled artisan. At the end of the ozonolysis reaction, the reaction mixture is preferably flushed with oxygen to remove unreacted ozone from the ozonized nanotubes.

Alternatively, exposure of the carbon nanotube dispersion to the ozone/oxygen mixture can take place with the nanotube dispersion in the gaseous phase. In such embodiment, a thinly spread nanotube film, bucky paper, or powder is contacted with an ozone/oxygen mixture as defined above. The exposure of the carbon nanotube film or powder to the ozone/oxygen mixture takes place at a temperature of from about 0° C. to about 100° C., preferably at room temperature. Ozonolysis in the gas phase is preferred when nanotubes are grown and/or aligned on a substrate.

In another embodiment of the present invention, a carbon nanotube which comprises a high degree of oxygen moieties attached to its sidewall is provided. Examples of oxygen moieties include carboxylic moieties; esteric moieties; carbonyl moieties, such as, ketonic and/or aldehydic moieties; alcoholic and ether moieties.

The quantity of oxygen moieties that are attached to the sidewall of a carbon nanotube can be expressed by defining the percentage of carbon atoms which have an oxygen moiety attached. The percentage can be expressed as a percentage range. Preferably, the range of the quantity of sidewall carbon atoms that have an oxygen moiety attached has a lower boundary of approximately 1%. Examples of other lower boundaries include approximately 3%, 5% and 8%. Preferably, the range of the quantity of sidewall carbon atoms that have an oxygen moiety attached has an upper boundary of approximately 16%. Examples of other upper boundaries include approximately 10%, 12% and 15%. The most preferred range is about 5 to 10%.

In one embodiment, the oxygen moieties attached to the sidewall of a nanotube of the present invention comprise a high degree of carboxylic and/or esteric moieties. For example, at least about forty percent, at least about fifty percent, or at least about sixty percent of the oxygen moieties attached to the sidewall of a nanotube are carboxylic and/or esteric moieties.

In another embodiment, the oxygen moieties attached to the sidewall of a nanotube comprise a high degree of ketonic and/or aldehydic moieties. For example, at least about thirty percent, at least about forty percent, or at least about fifty percent of the oxygen moieties are ketonic and/or aldehydic moieties.

In a further embodiment, the oxygen moieties attached to the sidewall of a nanotube comprise a high degree of alcoholic and/or ether moieties. For example at least about twenty percent, at least about thirty percent, or at least about forty percent of the oxygen moieties are alcoholic and/or ether moieties.

In another aspect, the present invention provides a method of functionalizing the sidewalls of a plurality of carbon nanotubes. The method comprises providing a plurality of ozonized carbon nanotubes. Preferably, the plurality of ozonized carbon nanotubes are produced as described above. The plurality of ozonized carbon nanotubes is contacted with a cleaving agent to form a plurality of sidewall-functionalized carbon nanotubes. Examples of cleaving agents include hydrogen peroxide, dimethyl sulfide, a salt of borohydride, a mixture of salts of borohydride, lithium aluminum hydride, zinc dust or silver oxide.

Contacting with cleaving agents preferably comprises incubating the ozonized carbon nanotubes with cleaving agents at a temperature of from about −95° C. to about −65° C., more preferably from about −95° C. to about −70° C., and most preferably from a temperature of from about −95° C. to about −80° C. Incubation at these temperatures takes place for about ten minutes to about twelve hours, preferably from about twenty minutes to about a an hour, more preferably from about fifteen minutes to about thirty minutes.

In one embodiment, the cleaving agent is a non-organic peroxide such as, for example, hydrogen peroxide, and sodium peroxide; or an organic peroxide, such as, for example, benzoyl peroxide. The concentration of the peroxide solutions depends on the reactivity of the specific peroxide. For example, the hydrogen peroxide is in an aqueous solution wherein the solution comprises about 30-70 wt % of hydrogen peroxide, preferably about 40-60 wt % of hydrogen peroxide. The amount by weight of an aqueous hydrogen peroxide solution to the amount by weight of the carbon nanotube dispersion is in a ratio from about 1:50 to about 1:5, preferably from about 1:30 to about 1:10.

Preferably, in order to ensure completion of the reaction, the aqueous hydrogen peroxide solution in contact with the carbon nanotube dispersion is heated to a temperature of about −60° C. to about 95° C., more preferably to about 0° C. to about 80° C., and most preferably to about 65° C. to about 75° C. During heating, preferably, the aqueous hydrogen peroxide solution in contact with the carbon nanotube dispersion is refluxed for about two to six hours, preferably for about three to five hours.

In another embodiment, the cleaving agent is a reducing agent, such as, for example, dimethyl sulfide, triethyl amine, piperidine, 3'-thiodipropionic acid and its salts, and a dimethyl sulfide-borane mix.

Without wanting to be bound by a theory, it is believed that the reaction of dimethyl sulfide with an ozonized carbon nanotube is diffusion-limited, i.e. the reaction will occur if the dimethyl sulfide can come into contact with a primary ozonide on the nanotube sidewall. Accordingly, it is preferred to add the dimethyl sulfide in excess.

The amount by weight of dimethyl sulfide to the amount by weight of the carbon nanotube dispersion is in a ratio from about 10:1 to about 100:1, preferably from about 20:1 to about 50:1.

Preferably, the dimethyl sulfide in contact with the carbon nanotube dispersion is stirred for about 5 to 48 hours, more preferably for about 24 hours. Preferably, the reaction mixture is brought to room temperature.

In another embodiment, the cleaving agent is a salt of borohydride or lithium aluminum hydride. The salt of borohydride is, for example, a sodium borohydride, potassium borohydride, lithium borohydride, tetraethylammonium borohydride, tetrabutylammonium borohydride, sodium triacetoxyborohydride, or mixtures thereof.

Without wanting to be bound by a theory, it is believed that the reaction of a salt of borohydride or lithium aluminum hydride with an ozonized carbon nanotube is diffusion-limited. Accordingly, it is preferred to add the salt of borohydride or lithium aluminum hydride in excess.

The amount by weight of a salt of borohydride or lithium aluminum hydride to the amount by weight of the carbon nanotube dispersion is in a ratio from about 2:1 to about 50:1, preferably from about 5:1 to about 30:1.

Preferably, the salt of borohydride or lithium aluminum hydride in contact with the carbon nanotube dispersion is stirred for about 2 to 20 hours, more preferably for about 12 hours. Preferably, the reaction mixture is brought to room temperature.

After contacting the plurality of ozonized nanotubes with a cleaving agent to form sidewall functionalized carbon nanotubes, the sidewall functionalized carbon nanotubes are preferably quenched. Quenching neutralizes the cleaving agents. Preferably, the nanotubes which are cleaved with hydrogen peroxide, with salts of borohydride, or with lithium aluminum hydride are quenched with acids, such as, for example, hydrochloric acid and acetic acid. Preferably, the nanotubes which are cleaved with dimethyl sulfide are quenched with organic solvents, such as, for example, methanol.

In another aspect of the invention, a method of controlling the type of oxygen moieties on the sidewalls of carbon nanotubes is provided. A plurality of ozonized carbon nanotubes are contacted with cleaving agents as described above. The type of cleaving agent used controls which oxygen moieties predominate.

The use of an inorganic peroxide, such as a hydrogen peroxide solution; an organic peroxide such as benzoly peroxide; silver oxide; or zinc dust as cleaving agents, provides carbon nanotubes in which carboxylic and/or esteric moieties predominate on the side walls.

The use of dimethyl sulfide, piperidine, triethylamine or 3'-thiodipropionic acid, as cleaving agents, provides carbon nanotubes in which ketonic and/or aldehydic moieties predominate.

The use of sodium borohydride, potassium borohydride, lithium borohydride, tetraethylammonium borohydride, tetrabutylammonium borohydride, or sodium triacetoxyborohydride, as cleaving agents, provides nanotubes in which alcoholic and/or ether moieties predominate.

In another embodiment of the present invention, a carbon nanotube which has a high degree of purity is provided. For the purposes of this specification, purity refers to nanotubes which are substantially free of contaminant material, such as metallic and amorphous impurities.

An example of a metallic impurity is iron. A nanotube of the present invention comprise less than about 2 wt. % of iron, less than about 1.5 wt. % of iron, less than about 1.25 wt. % of iron, less than about 0.5 wt. % of iron, or less than about 0.1 wt. % of iron. These weight percentages refer to both a single nanotube and nanotube dispersions.

An example of an amorphous impurity is amorphous carbon. The nanotubes comprise less than about 1 wt % amorphous carbon.

In another aspect, the present invention provides a method of purifying a plurality of carbon nanotubes, the method comprises providing a plurality of carbon nanotubes with oxygen moieties attached to their sidewalls as described above. After contacting the plurality of ozonized nanotubes with a cleaving agent to form sidewall functionalized carbon nanotubes, the sidewall functionalized carbon nanotubes are quenched, as described above; and purified.

Purification comprises acid treatment and, preferably, extensive washing. Quenching and purification can take place in any order, including simultaneously. Acid treatment comprises contacting the cleaved nanotubes with an acid, such as hydrochloric acid and acetic acid. Washing comprises exposing the cleaved nanotubes to water; aqueous solvents; acids, such as hydrochloric acid and acetic acid; organic solvents, such as methanol, tetrahydrofuran, dimethylsulfoxide, dimethylformamide, ethanol, 2-propanol, acetone, o-dichlorobenzene (ODCB), ethyl acetate, and benzene; or mixtures thereof.

In order to obtain a nanotube of the present invention which comprises less than about 0.1 wt. % of iron, some or all of the purification steps can be repeated.

In another embodiment of the present invention, a carbon nanotube which comprises a high degree of functional moieties attached to its sidewall is provided. Examples of functional moieties include amides, thiols, acid halides, anhydrides, lactams, imides, lactones, nitriles, and mixtures thereof.

The quantity of functional moieties that are attached to the sidewall of a carbon nanotube can be expressed by defining the percentage of carbon atoms which have a functional moiety attached. The percentage can be expressed as a percentage range. Preferably, the range of the quantity of sidewall carbon atoms that have a functional moiety attached has a lower boundary of approximately 1%. Examples of other lower boundaries include approximately 3%, 5% and 8%. Preferably, the range of the quantity of sidewall carbon atoms that have an oxygen moiety attached has an upper boundary of approximately 16%. Examples of other upper boundaries include approximately 10%, 12% and 15%. The most preferred range is about 5 to 10%.

In another aspect, the present invention provides a method of functionalizing the sidewalls of carbon nanotubes. The method comprises providing a plurality of carbon nanotubes with oxygen moieties attached to their sidewalls as described above. The oxygen moieties on the sidewall are converted to other functional moieties, such as amides, thiols, acid halides, anhydrides, lactams, imides, lactones, nitriles, and mixtures thereof. Chemical methods of converting oxygen moieties into other functional moieties are known in the art. Examples of such chemical methods can be found in the following references: Smith et al. *March's Advanced Organic Chemistry: Reactions, Mechanisms, and Structure*. John Wiley and Sons, 5$^{th}$ edition. 2000; Carey et al. *Advanced Organic Chemistry, Part A: Structure and Mechanisms*; and Carey et al. *Advanced Organic Chemistry, Part B: Reaction and Synthesis*. Kluwer Publishers, 4$^{th}$ edition, 2000. Some of the functional moieties can be produced directly from the primary ozonides, such as amines, by reacting piperidines with the ozonides, as known in the art.

In one embodiment of the present invention, a method of providing single carbon nanotubes and carbon nanotube bundles with a selected diameter is provided. The method comprising ozonizing and functionalizing the sidewalls of carbon nanotube in a carbon nanotube dispersion as described above, and retrieving the single carbon nanotubes and carbon nanotube bundles with a selected diameter from the dispersion. Retrieval comprises selective solubilization. There is an inverse correlation between the diameter of a nanotube and the percentage of the nanotube's surface which is functionalized, i.e., the smaller the diameter of a nanotube, the greater proportion of its surface area has attached functional moieties. Without wishing to be bound by a theory, it is believed that the degree of functionalization correlates with solubility and thus, the more functionalized (smaller diameter) tubes would be more easily solubilized. The more easily solubilized nanotubes are readily recovered by solvent removal, while the less functionalized tubes would be left behind, to be recovered by filtration. Different solvents are used to retrieve different size bundles.

In another aspect of the invention, a method of shortening the length of carbon nanotubes in a dispersion is provided. The method comprises ozonizing nanotubes in a dispersion and functionalizing the sidewalls of the nanotubes with oxygenated moieties as described above.

In another aspect, the methods of ozonizing and functionalizing nanotubes provided by the invention can be used to ozonize and functionalize self-assembled nanotubes, such as nanotubes arranged in a patterned array. Also, the ozonized nanotubes of the present invention can be bundled together into larger aggregates, such as hydrogels. The aggregations can range in size from about hundreds of nanometers to tens of microns.

In another aspect, a method of aggregating nanotubes is provided. Carbon nanotubes are functionalized with oxygen moieties as described above. Then the solvent of the nanotube dispersion is removed, thereby aggregating the nanotubes. Without wishing to be bound by a theory, it is believed that such aggregations form due to the high degree of hydrogen bonding and van der Waals forces exhibited by nanotubes of this invention. The aggregations can range in size from about tens of nanometers to tens of microns.

In one embodiment, the sidewall-functionalized nanotubes of the present invention are covalently linked to at least one organic or inorganic ligand to form a heterostructure or adduct. Examples of such ligands include nanocrystals, such as quantum dots, metal oxides, colloidal elemental metals, and nanobimetallic dispersions; metal clusters; metal coordination complexes; nanoparticles; macrocyclic molecules; a polypeptide, or a polymer. U.S. patent application Ser. No. 10/342,147 discloses carbon nanotube-nanocrystal heterostructures; this application is incorporated herein by reference in its entirety. U.S. patent application Ser. No. 10/615,492 discloses carbon nanotube adducts; this application is incorporated herein by reference in its entirety. Other structures which are linked to the sidewall-functionalized nanotubes of this invention are known in the art. Such structures are described in the following references: "Rational chemical strategies for carbon nanotube functionalization" Banerjee et al., Department of Chemistry, State University of New York at Stony Brook, Stony Brook, N.Y., USA. Chemistry—A European Journal (2003), 9(9), 1898-1908. CODEN: CEUJED ISSN: 0947-6539. Journal; General Review written in English. CAN 139:138895 AN 2003:405410 CAPLUS; Functionalization of single-walled carbon nanotubes. Hirsch, Andreas. Institut für Organische Chemie der Universität Erlangen-Nürnberg, Erlangen, Germany. Angewandte Chemie, International Edition (2002), 41(11), 1853-1859. CODEN: ACIEF5 ISSN: 1433-7851. Journal; General Review written in English. CAN 137:112800 AN 2002:471562 CAPLUS; "Chemical functionalization of carbon nanotubes". Sinnott, Susan B. Department of Materials Science and Engineering, University of Florida, Gainesville, Fla., USA. Journal of Nanoscience and Nanotechnology (2002), 2(2), 113-123. CODEN: JNNOAR Journal; General Review written in English. CAN 137:127061 AN 2002:448729 CAPLUS; "Carbon nanotubes: synthesis, integration, and properties". Dai Hongjie Department of Chemistry, Stanford University, Stanford, Calif. 94305, USA. hdail@stanford.edu Acc Chem Res (2002 December), 35(12), 1035-44. Journal code: 0157313. ISSN: 0001-4842. United States. Journal; Article; (JOURNAL ARTICLE) written in English. DN 22372666 PubMed ID 12484791 AN 2002722570 MEDLINE; "Carbon Nanotubes" Haddon, Robert C. University of California, Riverside, Calif., USA. Accounts of Chemical Research (2002), 35(12), 997. CODEN: ACHRE4 ISSN: 0001-4842. Journal; General Review written in English. CAN 138:7343 AN 2002:951409 CAPLUS; "Covalent chemistry of single-wall carbon nanotubes" Bahr et al. Department of Chemistry and Center for Nanoscale Science and Technology, Rice University, Houston, Tex., USA. Journal of Materials Chemistry (2002), 12(7), 1952-1958. CODEN: JMACEP ISSN: 0959-9428. Journal; General Review written in English. CAN 137:284682 AN 2002:470004 CAPLUS In another embodiment, the sidewall-functionalized carbon nanotubes of the present invention are part of a polymer composite structure. Polymer composite structures are known in the art. Such structures are described in the following references: Dalton et al. *Nature* 2003, 423, 703; Shaffer et al., *Chem. Commun.* 2002, 18, 2074; Haggenmuller et al., *Nanosci. Nanotech.* 2003, 3, 105-110. Nanotubes can be covalently or noncovalently linked to the polymer. The large number of functional groups on the tubes would facilitate better load transfer to the polymer.

In another aspect of the invention, a device comprising the nanotubes of the invention is provided. The device can be, for example, sensors, a device used in molecular electronics, solar cells, a device used in optoelectronics, a device used in nanocatalysis and scanning probe microscopy tips.

EXAMPLES

Ozonolysis of SWNTs. The ozonolysis reaction was carried out on a commercial Weisbach ozonolysis apparatus. In this instrument, the flow of $O_2$ to the arc discharge was kept below 1.5 psi. Ozone is formed in a 185 W discharge with the pressure adjusted to maintain a constant flow of a ~10% $O_3$ in oxygen mixture to the sample at a pressure of under 3 psi. Typically, 100 mg of as-prepared HiPco SWNTs (Carbon Nanotechnologies, Houston, Tex.) were first dispersed in 150 mL methanol (MeOH) by extensive sonication, prior to each 1 h run. The reaction mixture was stirred vigorously during ozonolysis, which was carried out at −78° C. by placing the reaction flask in a dry ice/acetone bath, to create the expected ozonide intermediate. The reaction mixture was then flushed with $O_2$ at the end of ozonolysis to rid the solution of any remaining $O_3$.

Controllable Modification of Ozone-Treated Tubes. The expected primary ozonide generated can be cleaved in a number of ways by initial incubation with specific reagents at −78° C. The "cleaving" agents used included $H_2O_2$, DMS, and $NaBH_4$, yielding samples designated 1, 2, and 3, respectively.

In the case of sample 1, upon addition of ~10 mL of 50% $H_2O_2$ in aqueous solution, the sample was heated to 70° C. and refluxed for 4 h. The $H_2O_2$-cleaved tubes were then filtered over a 0.2 μm polycarbonate membrane and washed with a large excess of MeOH to remove any lingering $H_2O_2$ as well as any impurities such as amorphous carbon.

To create samples 2 and 3 respectively, DMS and $NaBH_4$ were added in large excess. After the reaction was stirred for 24 h, the DMS-cleaved tubes were filtered over 0.2 μm polycarbonate membranes; the residue was washed extensively with methanol to quench the DMS. With the $NaBH_4$-cleaved tubes, after the reaction was stirred for 12 h, the borohydride reagent was quenched by addition of 12.1 N HCl. The resultant tubes were filtered over a 0.2 μm polycarbonate membrane and then washed continuously with concentrated HCl and with methanol. All samples, 1 through 3, were washed with copious amounts of distilled, deionized water.

A control sample, Ctrl, was generated by subjecting a nanotube sample to ozonolysis in methanol but without the addition of any further "cleaving" reagent. To reflect the types of treatment of the other samples, the control was filtered over a 0.2 μm polycarbonate membrane and washed extensively with methanol and $H_2O$.

As a final step, the samples, which resembled mats of bucky paper, were peeled off from the filter membranes and dried in a heating oven at 100° C.

X-ray Photoelectron Spectroscopy. For XPS analysis, the solid samples were attached to stainless steel holders using conductive double-sided tape and installed in the vacuum chamber of a XPS surface analysis system (Kratos Analytical Plc model DS800). The chamber was evacuated to a base pressure of about $5 \times 10^{-9}$ Torr. A hemispherical energy analyzer was used for electron detection. XPS spectra were first collected using a Mg Kα X-ray source at 80 eV pass energy and at 0.75 eV steps for each sample. High-resolution spectra were collected at a pass energy of 10 eV and in 0.1 eV steps.

Electron Microscopy. Samples for TEM were obtained by drying sample droplets from an ethanolic solution onto a 300 mesh Cu grid with a lacey carbon film. All the micrographs were taken at an accelerating voltage of 120 kV on a Philips CM12 TEM, equipped with EDAX capabilities. Samples for SEM were drop dried on Cu grids and imaged in a homemade sample holder on a Leo 1550 field emission instrument at accelerating voltages ranging from 2 to 10 kV at a 2 mm working distance.

Optical Spectroscopy. UV spectra were obtained at high resolution on a ThermoSpectronics UVI using quartz cells with a 10 mm path length. Near-IR spectra were obtained in transmission on a Vector 33 spectrophotometer (Brüker Optics), after 32 scans, using a 1 mm path length capillary tube. UV-vis and near-IR spectra were obtained by dissolving the SWNT samples in o-dichlorobenzene (ODCB) by sonication and were corrected to account for the solvent background. FT Raman spectra were collected on a RFS 100 spectrometer by placing the samples on an aluminum slide and collecting data in a standard macrochamber. The Raman data were obtained, after 256 scans, upon excitation of a 1064 nm Nd:YAG Laser at a power of ~100 mW, using a liquid $N_2$ cooled Ge detector.

Results

Figure 1A:
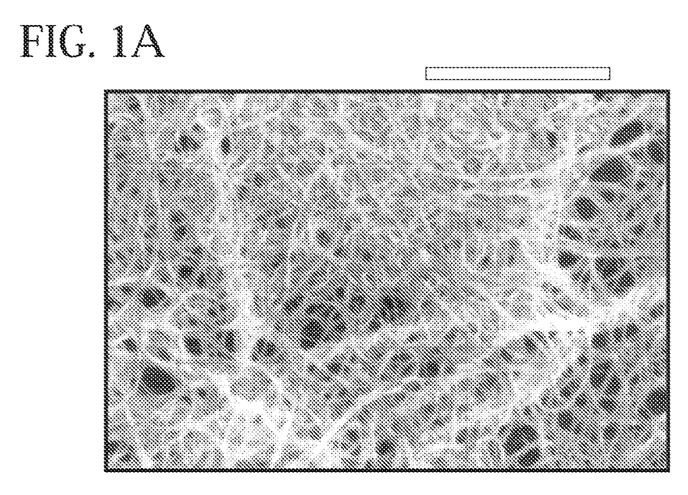
Figure 1B:
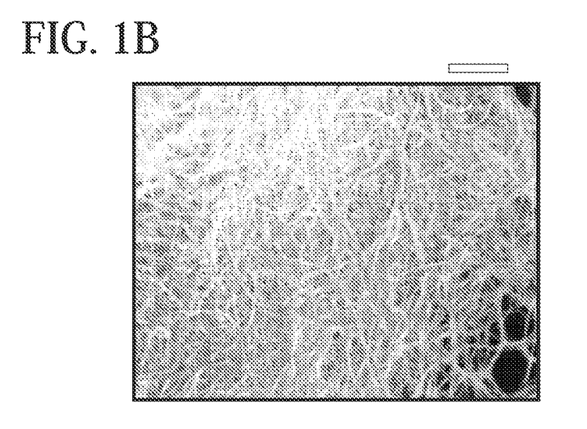
Figure 1C:
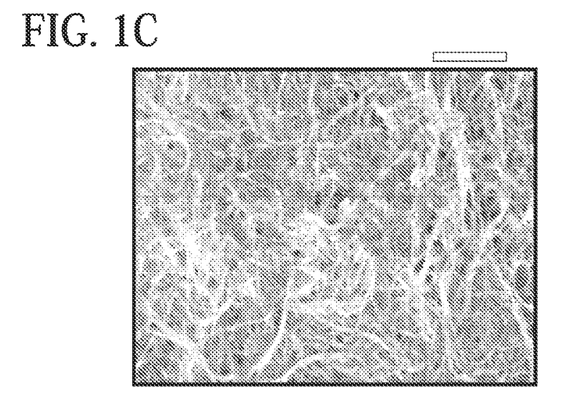
Figure 1D:
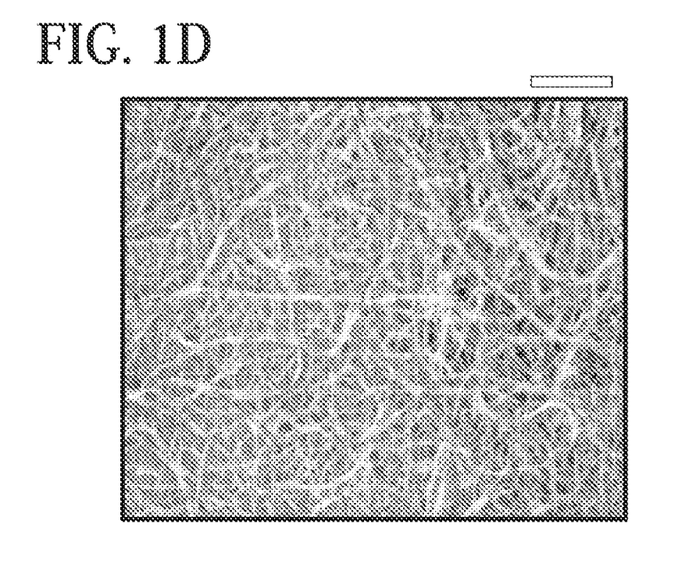
Figure 1E:
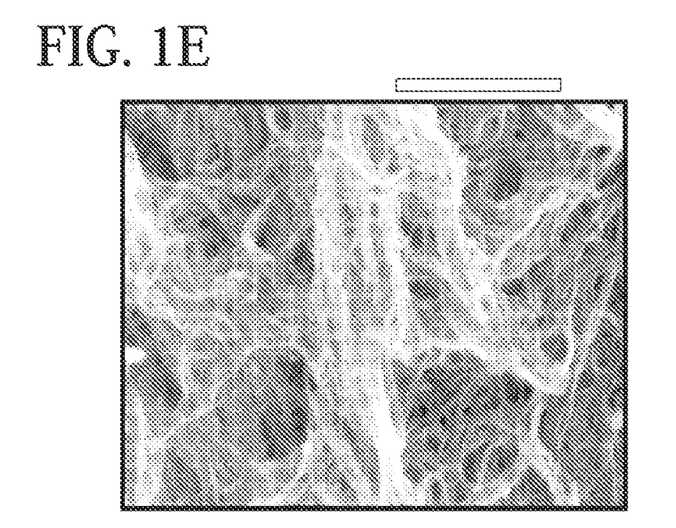
Figure 2A:
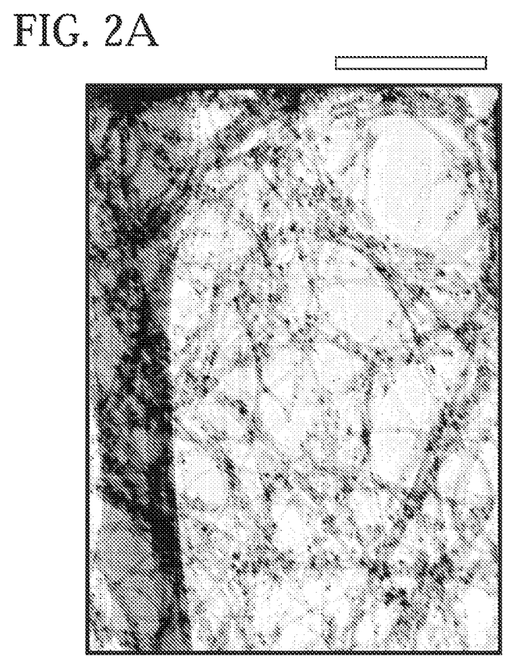
Figure 2B:
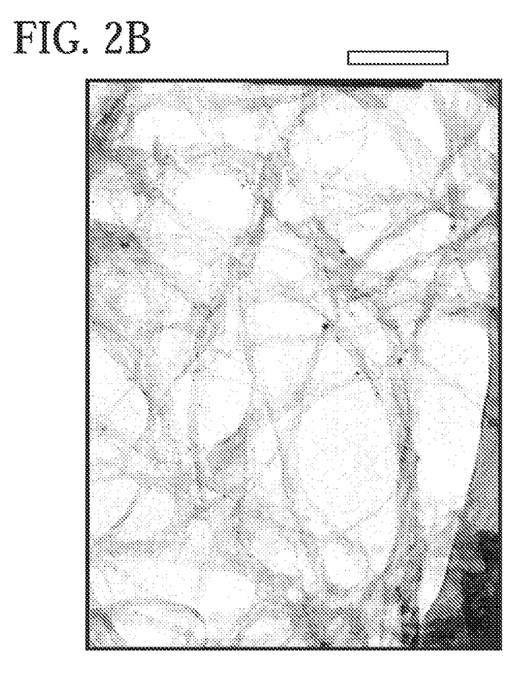

I. Purification. The SEM (FIG. 1) and TEM (FIG. 2) micrographs indicate the increased purity of the ozonized tubes, compared with as-prepared tubes. For instance, a large amount of contaminant material, particularly amorphous carbon, noted in FIG. 1*a*, in the initial, raw HiPco sample, is substantially removed in the subsequent micrographs (FIG. 1, parts b-e) after ozonolysis and associated treatments.

Upon ozonolysis, amorphous carbon detritus, onions, and nanoparticles become heavily functionalized with oxygenated groups and thereby have increased solubility in polar solvents, used to wash these samples. The reactivity of these contaminant materials is analogous to the reactivity at the end caps of the tubes, which are opened upon oxidation. Indeed, there is also enhanced reactivity in regions of increased curvature and conformational strain, notably at high densities of pentagonal and heptagonal defect sites. Ozone can oxidize the graphitic coating surrounding the Fe metal catalyst particles to their corresponding, less dense iron oxides, which can then breach the carbon shells, exposing metal particulates to further removal by chemical reagents. As such, the ozonolysis process essentially facilitates the elimination of the unwanted Fe metal by subsequent chemical processing of SWNTs during sidewall functionalization.

For example, hydrogen peroxide can leach iron oxide clusters into solution. Thus, the $O_3/H_2O_2$ combined protocol is very successful at removing iron, which is evident as seen in sample 1, shown in FIG. 1e, to a percentage of about 0.25% from a high of about 4-5% in unprocessed HiPco. Use of hydrogen peroxide alone, without ozonolysis treatment, is able to reduce the iron content to 1.37%, indicating the ability of this reagent to leach iron oxide clusters into solution. After ozonolysis, the processing of sample 3 involves an acid treatment to quench the borohydride reagent, which has the complementary effect of lowering Fe concentrations to only 0.48%. It is of note that a $NaBH_4/HCl$ treatment, without ozonolysis, on the SWNTs can reduce the iron content in the sample to ~1.16% only. The implication then is that most of the residual, extraneous iron is likely encapsulated within a carbon shell, that needs to be reacted with ozonolysis, in order for it to be properly eliminated by means of HCl. Indeed, use of DMS or $NaBH_4$ alone is not capable of removing substantial Fe, but rather is a means of obtaining some level of rational chemical control over the identity of the resultant functional groups on the tube surface. Thus, ozonolysis, coupled with further specific chemical processing, is used for SWNT purification.

In effect, the ozonized, purified nanotubes form close-packed, ordered bundles, which, compared with as-prepared HiPco tubes, are more difficult to disperse and solubilize in nonpolar, organic solvents, such as ODCB. This is likely an effect not only of the increased crystallinity of these tubes but also of the abundance of polar groups present on the SWNT surface, leading to the likelihood of increased hydrogen bonding interactions that can result in better packing and stacking among the tubes within the bundles. Sample 1, for instance, is easily dispersed in dimethyl sulfoxide (DMSO).

Figure 3:
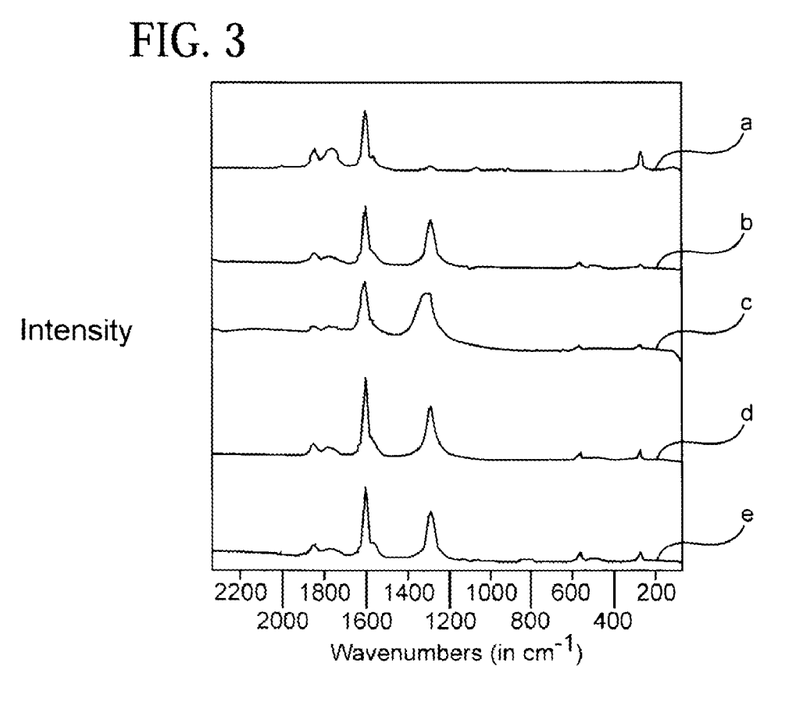
FIG. 3: FT-Raman spectra of (a) as-prepared HiPCo, (b) sample 2 (with DMS), (c) sample 1 (with $H_2O_2$), (d) Ctrl sample, and (e) sample 3 (with $NaBH_4$). Upon ozonolysis, the intensity of the D line is greatly increased relative to that of the G line. The Raman spectra were obtained on solid samples, placed on Aluminum slides.

II. Sidewall Functionalization. Raman spectra for HiPco tubes and for samples 1-3 as well as the Ctrl sample are shown in FIG. 3. Raman spectroscopy is particularly important for understanding the vibrational and electronic properties of nanotubes and fullerenes. For instance, whereas the radial breathing modes (RBM) near 200 $cm^{-1}$ depend sensitively on tube diameter, the high-frequency tangential displacement G modes near ~1590 $cm^{-1}$ and the second-order G' bands near 2600 $cm^{-1}$ are sensitive to the charge exchanged between nanotubes and guest atoms that have intercalated into the interstitial channels in the tube bundles. Importantly for this work, the shape and intensity of a weak disorder mode peak at 1290-1320 $cm^{-1}$ has been correlated with the extent of nanotube sidewall functionalization. Other bands occur in the 1600-1900 $cm^{-1}$ region of the Raman spectra. The origin of these peaks is not due to impurities but rather to second-order features arising from combination modes. Specifically they correspond to $\omega_{tangential}+\omega_{RBM}$ and $\omega_{tangential}+2\omega_{RBM}$ combination bands. Because of resonant Raman effects linked to singularities in the one-dimensional electron density of states in the first-order spectra, these phenomena also give rise to resonant effects in the associated combination modes. It is of note that the laser excitation at 1064 nm used will probe primarily semiconducting tubes. The laser excitation at 785 nm probes primarily metallic tubes. From Raman evidence it has been found that smaller tubes are more easily functionalized by ozonolysis.

The Raman spectra for these samples indicate that substantial sidewall functionalization does take place while still preserving the tubular nature. Evidence for sidewall functionalization comes from the increased intensity of the disordered spa-hybridized D line at ~1320 $cm^{-1}$ with respect to the tangential nanotube Raman mode near 1590 $cm^{-1}$. The increased ratio of the disorder band intensity to the tangential mode intensity is widely accepted as arising from sidewall functionalization, due to the increased numbers of $sp^3$-hybridized carbon atoms in the hexagonal framework of the SWNT sidewalls. The chemical derivatization effectively perturbs the excitations between $\pi$-bands of the bare $sp^2$ hybridized HiPco tubes. Because of the weakness of the disorder band in raw HiPco tubes, the high purity of the functionalized samples, as evidenced by the microscopy data, precludes amorphous carbon, detritus, and nanobubbles as being the origin of the disorder band noted with the processed samples.

To the extent that ozonolysis likely increases the presence of defect sites on the tube surface, the reaction does not substantially etch and physically destroy the SWNTs themselves, as would be apparent from acid treatments, which would cut the ends of these tubes into smaller fragments, for instance. That is, based on the SEM micrographs, no real shortening of the tubes was observed, prior to and after ozonolysis, and hence, a simple increase of defect sites at the ends and sidewalls of these SWNTs, due to ozonolysis "damage" is unlikely to be a significant contributor to the increase in the intensity of the disorder peak observed. Hence, the presence of sidewall functionalization, and the accompanying perturbation of electronic structure, effectively is responsible for the increase in the disordered D line.

Moreover, a decrease in the intensity of the RBM bands upon ozonolysis also is suggestive of the formation of covalent bonds along the sidewalls. The decrease of intensity of the second-order peaks observed with functionalization follows the trend of the first-order RBM peaks and is from the perturbation of the electronic density of states of SWNTs, which is evidenced by the absence of the optical transitions between the van Hove singularities. More specifically, the decrease in intensity likely originates in disruption of electron-phonon coupling interactions, unique to the one-dimensional structure of electronic states for SWNTs. These results demonstrate sidewall functionalization.

Figure 4:
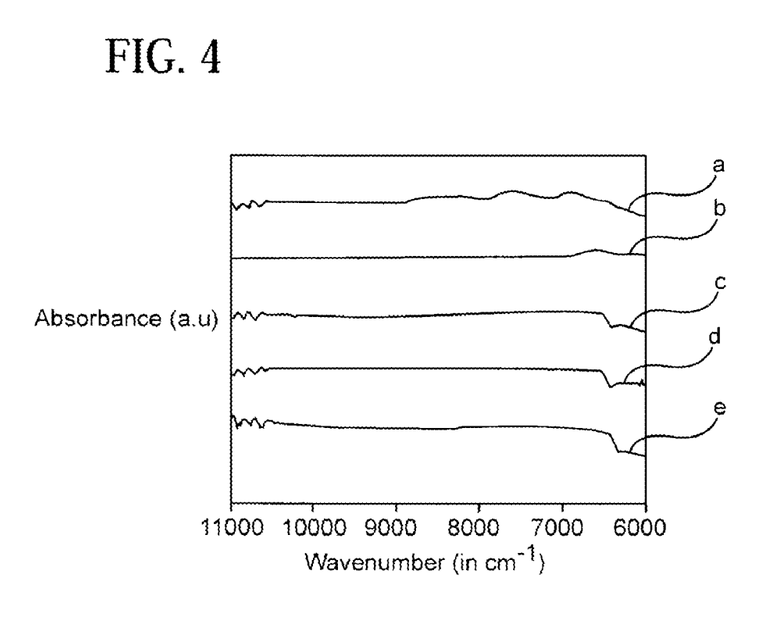
FIG. 4: Near-IR spectra of (a) as-prepared HiPco, (b) sample 1 (with $H_2O_2$), (c) sample 2 (with DMS), (d) sample 3 (with $NaBH_4$), and (e) Ctrl sample. All the samples were in ODCB solution. The spectra were background subtracted for the solvent.
Figure 5:
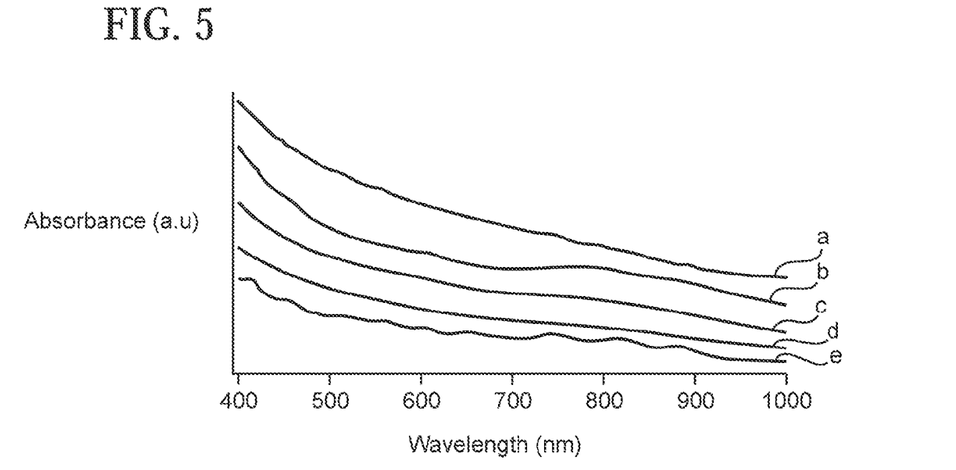
FIG. 5: UV-vis spectra in ODCB of (a) sample 1 (with $H_2O_2$) (black), (b) sample 2 (with DMS) (blue), (c) sample 3 (with $NaBH_4$) (green), (d) Ctrl sample (pink), and (e) as-prepared HiPco (red). The individual spectra are offset for clarity.

Further evidence for sidewall functionalization comes from near-IR (FIG. 4) and UV-visible spectra (FIG. 5). The features seen in the UV-vis-NIR spectra of pristine SWNTs arise from optical transitions between van Hove singularities of the local electronic density of states of these tubes. Sidewall functionalization is predicted to disrupt the electronic structure of SWNTs and, hence, cause a loss of these features, whereas oxidative purification has been shown to perturb their intensity. Indeed in the UV-visible spectra, distinctive peaks corresponding to the second transition of semiconducting SWNTs (550-900 nm) and the first transition of metallic tubes (400-600 nm) are noted for the HiPco tubes dispersed in ODCB. After the ozonolysis reaction, these features are substantially broadened and are diminished in resolution. Similarly, in the NIR spectra, HiPco tubes show low energy features, corresponding to the first band gap transition (6000-

7500 cm$^{-1}$) of semiconducting tubes. In an analogous fashion, after the ozonolysis reaction, the resultant spectra are featureless. This is thus further proof that the electronic structure of SWNTs is extensively perturbed by sidewall oxidation. This evident disruption of the extended π system in SWNTs is consistent with sidewall functionalization and moreover, is not observed on derivatization, localized simply at the end caps. The generally smaller diameters (0.7-1.1 nm) of HiPco tubes, as compared with tubes produced by traditional arc discharge or laser vaporization techniques, likely makes them more susceptible to sidewall oxidation than larger tubes.

III. Achieving a Degree of Control over Functional Groups in Ozonized SWNTs. A certain degree of control over SWNT chemical derivatization using ozonolysis without disrupting the tubular bundles has been achieved. In independent runs, the ozonized tubes were reacted with several types of reagents known to cleave the primary ozonide intermediates in different ways (FIG. 6). In organic systems, primary ozonides undergo oxidative cleavage with H$_2$O$_2$ to give primarily carboxylic acid and ester groups and with DMS to yield predominantly carbonyl (keto or aldehydic) functionalities. Similarly, reductive cleavage with NaBH$_4$ leads to the generation of alcoholic groups. High-resolution XPS spectra show that upon ozonolysis followed by cleavage with the reagents described above, the relative concentrations of the oxygenated functionalities vary from sample to sample. Because of the extensive treatment and hence, high purity of the resultant SWNT samples studied, the XPS data is reliable.

To support this assertion, no noticeable trace of Na, B, or S was detected in the XPS analysis, indicating that the cleaving reagents were completely removed by the washing process. Regarding the presence of iron due to the metal catalysts in raw HiPco tubes (which is normally 4-5%), treatment with O$_3$, followed by the appropriate chemical workup, was found to lower the Fe content to 1.47% (Ctrl sample). After one cycle of NaBH$_4$ addition followed by HCl washes, following ozonolysis, the Fe content in sample 3 was reduced to 0.48%. Notably, the amount of Fe in sample 1, from a combined ozonolysis/hydrogen peroxide treatment, was found to be the lowest at 0.25%. Use of H$_2$O$_2$ alone on raw tubes can only reduce the Fe content only to 1.37% whereas utilization of NaBH$_4$/HCl alone will lower Fe content to only 1.16%.

The distribution of functionalities has been deduced from the high-resolution C$_{1s}$ XPS spectra (FIG. 7). The data can be fitted to values close to those for graphite and more specifically, to those reported in the literature for carbon nanotubes. FIG. 7 shows the high-resolution C$_{1s}$ spectra of the various functionalized nanotubes. In each spectrum, the main peak at 284.6 eV is assigned to the C$_{1s}$ binding energy for the SWNTs, representing the elemental sp$^2$ and sp$^3$ carbon atom; it has the same shape as the C$_{1s}$ peak in graphite. The shoulder of the main peak is composed of three peaks, assigned to the C$_{1s}$ of hydroxyl carbon (286.3 eV), that of carbonyl carbon (287.6 eV), and ultimately, that of carboxyl carbon (288.8 eV). The higher binding energies correlate with the increased numbers of 0 atoms bonded to C since the electronegative 0 atoms induce a positive charge on a carbon atom. Small features at the high binding energy side at ~290.7 eV have been relegated to the π-π* transitions accompanying the C$_{1s}$ excitation and are not included in the quantifications of the oxygenated functionalities.

Table 1 summarizes the relevant results. On simply passing ozone through a solution of nanotubes without the presence of a "cleaving" agent (Ctrl sample), the carboxyl and carbonyl species are found to predominate. This observation is consistent with gaseous ozonolysis data where quinone and ester species were found to be the most prevalent species. The increased alcohol content, noted in solution as compared with gaseous ozonolysis, is expected to arise from spontaneous decomposition of the ozonide intermediate in methanol.

TABLE 1

Relative Percentages of Surface-Functional, Oxygenated Groups Obtained from Curve Fitting of the C$_{1s}$ Peaks of the SWNT HiPco Samples Subjected to Ozonolysis in Methanol at −78° C., Followed by Selective Chemical Treatments

| sample | C—O species (alcohol) | C=O species (aldehye/ketone) | O—C=O species (carboxylic acid/ester) |
|---|---|---|---|
| Ctrl (untreated) | 13.3 | 50.8 | 35.9 |
| 1 (reaction with H$_2$O$_2$) | 37.0 | 9.4 | 53.6 |
| 2 (reaction with DMS) | 28.7 | 41.1 | 30.2 |
| 3 (reaction with NaBH$_4$) | 29.1 | 36.3 | 34.6 |

On cleaving the ozonide with H$_2$O$_2$, namely sample 1, the carboxylic acid/ester species become the major functional groups. Oxidative cleavage with DMS, in sample 2, ensures that the keto or aldehydic groups are the most abundant functionality. Finally, upon reductive cleavage of the ozonide intermediate through NaBH$_4$ reduction, yielding sample 3, the amount of alcoholic and ether species is more than double what one might expect with the untreated Ctrl sample. It is of note that most of the ether functionalities, if formed on the SWNT surface, would be transformed to alcohol because of the choice of methanol as the solvent.

H$_2$O$_2$ treatment, after ozonolysis, yields greater than 50% carboxylic acid (—COOH) functionalities, the predominant group in that set of data. These results are a clear improvement over conventional nanotube processing procedures, such as Ar$^+$ ion sputtering, where the percentage of carboxylic groups is ~15%. The large alcohol content in this sample, though, likely arises from a H$_2$O$_2$-iron particle interaction, which can form reactive secondary hydroxyl radicals. The importance of cleavage of the ozonide intermediate in generating the high quantity of carboxylic acid moieties also becomes apparent as treatment of HiPco tubes with simply hydrogen peroxide, without ozonolysis, yields predominantly hydroxyl groups (47%) and a noticeably lower amount of carboxylic acid groups (22%).

What is claimed is:

1. A single-walled carbon nanotube wherein about 8 to 16% of the carbon atoms on the sidewall of the nanotube have an attached oxygen moiety, wherein the attached oxygen moieties comprise a high degree of carboxylic and/or esteric moieties, wherein at least about forty percent of the oxygen moieties are carboxylic and/or esteric moieties.

2. A single-walled carbon nanotube of claim 1 wherein the range of the quantity of sidewall carbon atoms that have an oxygen moiety attached has an upper boundary of approximately 15%.

3. The single-walled carbon nanotube of claim 1 wherein at least about fifty percent of the oxygen moieties are carboxylic and/or esteric moieties.

4. A single-walled carbon nanotube wherein about 3 to 16% of the carbon atoms on the sidewall of the nanotube have an attached oxygen moiety, wherein the oxygen moieties comprise a high degree of ketonic and/or aldehydic moieties, wherein at least about thirty percent of the oxygen moieties are ketonic and/or aldehydic moieties.

5. A single-walled carbon nanotube of claim 4 wherein the range of the quantity of sidewall carbon atoms that have an oxygen moiety attached has a lower boundary of approximately 5%.

6. A single-walled carbon nanotube of claim 4 wherein the range of the quantity of sidewall carbon atoms that have an oxygen moiety attached has an upper boundary of approximately 15%.

7. The single-walled carbon nanotube of claim 4 wherein at least about forty percent of the oxygen moieties are ketonic and/or aldehydic moieties.

8. A single-walled carbon nanotube wherein about 3 to 16% of the carbon atoms on the sidewall of the nanotube have an attached oxygen moiety, wherein the oxygen moieties comprise a high degree of alcoholic and/or ether moieties, wherein at least about twenty percent of the oxygen moieties are alcoholic and/or ether moieties.

9. A single-walled carbon nanotube of claim 8 wherein the range of the quantity of sidewall carbon atoms that have an oxygen moiety attached has a lower boundary of approximately 5%.

10. A single-walled carbon nanotube of claim 8 wherein the range of the quantity of sidewall carbon atoms that have an oxygen moiety attached has an upper boundary of approximately 15%.

11. The single-walled carbon nanotube of claim 8 wherein at least about thirty percent of the oxygen moieties are alcoholic and/or ether moieties.

12. A single-walled carbon nanotube comprising oxygen moieties on its sidewall wherein the nanotube comprises less than about 2 wt. % of iron, and wherein about 8 to 16% of the carbon atoms on the sidewall of the nanotube have an attached oxygen moiety.

13. A single-walled carbon nanotube of claim 12 wherein the nanotube comprises less than about 1.5 wt. % of iron.

14. A single-walled carbon nanotube of claim 12 wherein at least about forty percent of the attached oxygen moieties are carboxylic and/or esteric moieties.

15. A single-walled carbon nanotube of claim 12 wherein at least about thirty percent of the oxygen moieties are ketonic and/or aldehydic moieties.

16. A single-walled carbon nanotube of claim 12 wherein at least about twenty percent of the oxygen moieties are alcoholic and/or ether moieties.

17. A single-walled carbon nanotube wherein about 3 to 16% of the carbon atoms on the sidewall of the nanotube have attached functional moieties selected from the group consisting of amides, thiols, acid halides, anhydrides, lactams, imides, lactones, nitriles and mixtures thereof.

18. A single-walled carbon nanotube of claim 17 wherein the range of the quantity of sidewall carbon atoms that have a functional moiety attached has a lower boundary of approximately 5%.

19. A single-walled carbon nanotube of claim 17 wherein the range of the quantity of sidewall carbon atoms that have a functional moiety attached has an upper boundary of approximately 15%.

20. A single-walled carbon nanotube of claim 17 wherein the range of the quantity of sidewall carbon atoms that have a functional moiety attached has a lower boundary of approximately 8%.

* * * * *